United States Patent
Fan et al.

(10) Patent No.: US 7,822,905 B2
(45) Date of Patent: Oct. 26, 2010

(54) BRIDGES CAPABLE OF CONTROLLING DATA FLUSHING AND METHODS FOR FLUSHING DATA

(75) Inventors: Jin Fan, Taipei County (TW); Xiaohua Xu, Taipei County (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 162 days.

(21) Appl. No.: 12/178,671

(22) Filed: Jul. 24, 2008

(65) Prior Publication Data

US 2009/0037619 A1    Feb. 5, 2009

(30) Foreign Application Priority Data

Jul. 30, 2007    (TW) ............... 96127720 A

(51) Int. Cl.
*G06F 3/00* (2006.01)
*G06F 13/20* (2006.01)

(52) U.S. Cl. ............ 710/310; 710/53; 710/57; 711/135; 711/153

(58) Field of Classification Search ......... 710/306, 710/310–311, 52–57; 711/154–156, 133–136
See application file for complete search history.

(56) References Cited

U.S. PATENT DOCUMENTS

| | | | | |
|---|---|---|---|---|
| 5,418,755 A | * | 5/1995 | Nguyen et al. | 365/230.08 |
| 5,533,341 A | * | 7/1996 | Schvester et al. | 62/50.1 |
| 5,936,640 A | * | 8/1999 | Horan et al. | 345/531 |
| 5,983,304 A | * | 11/1999 | Jin | 710/310 |
| 6,405,276 B1 | * | 6/2002 | Chen et al. | 710/310 |
| 7,475,200 B1 | * | 1/2009 | Melvin | 711/154 |
| 7,519,796 B1 | * | 4/2009 | Golla et al. | 712/225 |

* cited by examiner

*Primary Examiner*—Raymond N Phan
(74) *Attorney, Agent, or Firm*—Thomas, Kayden, Horstemeyer & Risley

(57) ABSTRACT

A bridge capable of preventing data inconsistency is provided, in which a first master device outputs a flush request, a buffering unit buffers data or instructions, and a flush request control circuit records a buffer write pointer of the buffer according to the flush request and outputs a flush acknowledgement signal to the first master device in response of that a buffer read pointer of the buffering unit is identical to the recorded buffer write pointer.

22 Claims, 7 Drawing Sheets

BRIDGES CAPABLE OF CONTROLLING DATA FLUSHING AND METHODS FOR FLUSHING DATA

BACKGROUND OF THE INVENTION

1. Field of the Invention

The invention relates to data flush methods, and more particularly, to data flush methods capable of preventing data inconsistency.

2. Description of the Related Art

Many computer systems incorporate at least two buses, one is commonly referred to as a memory bus for communication between a central processor and a main memory, and the other is known as a peripheral bus for communication between peripheral devices, such as graph systems, disk drives or local area networks (LANs). To allow data transfer between the buses, a bus bridge (hereinafter referred to as "bridge") is utilized to bridge and couple the buses together.

The primary task of a bridge is to allow data to cross from one bus to the other bus without diminishing the performance of either bus. To perform this function, the bridge must be able to comprehend and participate in the bus protocol of each of the buses. In particular, the bridge must be able of serve both, in a slave capacity and a master capacity, such that it can accept a request from a first bus as a slave, then initiate an appropriate bus operation on the other bus as a master. The bridge must, therefore, provide access support for crossing between one bus and another bus.

Typically, a bridge utilizes data buffering such that data to be transferred through the bridge from either the memory bus or the peripheral bus is temporarily stored, or "posted", within a data buffer. Posting data in a bridge can enhance the performance of the system by packetizing data and pre-fetching data, but can also introduce a problem of data consistency when synchronization events occur. When a synchronization event occurs and data remains posted in the bridge, data inconsistency may occur.

BRIEF SUMMARY OF THE INVENTION

Embodiments of a bridge are provided, in which a buffering unit buffers data or instructions, a first master device outputs a flush request to empty the buffering unit, and a flush request control circuit. The buffering unit comprises a buffer write pointer for designating a location that is written to and a buffer read pointer for designating a location that is read from. The flush request control circuit records the buffer write pointer of the buffer when receiving the flush request and outputs a flush acknowledgement signal to the first master device when the buffer read pointer of the buffering unit is identical to the recorded buffer write pointer, to inform the first master device that the buffering unit is empty.

The invention provides an embodiment of a flush request control circuit for generating a flush acknowledgement signal to represent that a buffering unit is empty according to a flush request. The buffering unit comprises a buffer write pointer for designating a location that is written to and a buffer read pointer for designating a location that is read from. In the flush request control circuit, a register records the buffer write pointer according to the flush request and outputs the buffer write pointer to serve as a comparison pointer, a comparator compares the comparison pointer with the buffer read pointer of the buffering unit to determine whether the buffering unit is empty, and an output unit outputs the flush acknowledgement signal according to the compared result. When the comparison pointer and the received buffer read pointer are identical, the output unit outputs the flush acknowledgement signal to represent that the buffering unit is empty.

The invention provides an embodiment of a data flush method for an electronic system. The electronic system comprises a buffering unit with a buffer write pointer for designating a location that is written to and a buffer read pointer for designating a location that is read from. The data flush method comprises following steps. The buffer write pointer of the buffering unit is recorded when receiving a flush request to empty the buffering unit from a first master device, the buffer read pointer of the buffering unit is compared with the recorded buffer write pointer, and a flush acknowledgement signal is outputted to the first master device when the buffer read pointer and the recorded buffer write pointer are identical.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
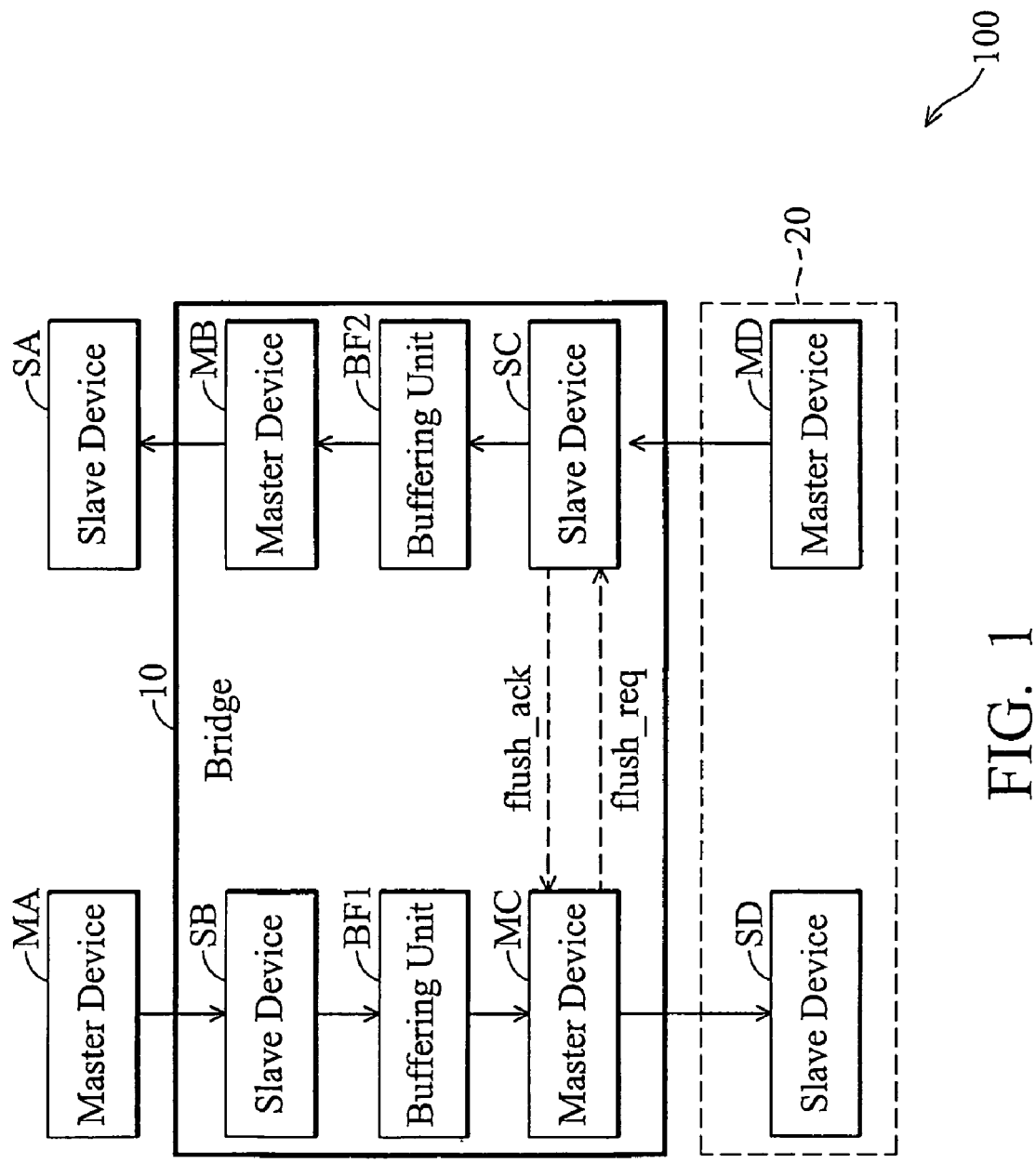
FIG. 1 shows an embodiment of an electronic system.

FIG. 1 shows an embodiment of an electronic system. As shown, the electronic system 100 can not only be implemented as a computer system but also a digital camera, a digital recorder, a consumer electronics device, a mobile communication device, a portable electronic device or a robot, but is not limited thereto. The electronic system 100 comprises a master device MA, a slave device SA, a bridge 10 and a peripheral device 20. For example, the master device MA can be a central processing unit (CPU), the slave device SA can be a system memory or a cache memory of the CPU, the peripheral device 20 can be a peripheral component interface (PCI) apparatus, but is not limited thereto. The bridge 10 comprises master devices MB and MC, slaver devices SB and SC, and buffering units BF1 and BF2. The peripheral device 20 comprises a master device MD and a slaver device SD. For example, each of buffering units BF1 and BF2 comprises one or more first in first output buffers (FIFOs).

When the master device MA requests to access the slave device SD in the peripheral device 20, the slave device SB receives transaction requests from the master device MA, and pushes the received transaction requests into the buffering unit BF1. The master unit MC executes the transaction requests pushed by the slave device SB in the buffering unit BF1, such that the slave device SD receives the transaction requests. On the contrary, when the master device MD in the peripheral device 20 requests to access the slave device SA, the slave device SC receives transaction requests from the master device SD and pushes the received transaction requests into the buffering unit BF2. The master device MB executes the transaction requests pushed by the slave device SC in the buffering unit BF2, such that the slave device SA receives the transaction requests. Generally, the transaction requests output to the slave device SD from the master device MA are referred to as downstream transactions, and the transaction requests output to the slave device SA from the master device MD are referred to as upstream transactions. In some examples, the transaction requests in one direction (downstream/upstream) must be accomplished before that in the other direction (upstream/downstream) are accomplished, to maintain order of the transaction requests and avoid data inconsistency problems.

For example, when accomplishing a write transaction request, the peripheral device 20 asserts an interrupt signal to the master device MA, such as a CPU, to indicate that the master device MA can read write data (i.e., new data) from the slave device SA, such as system memory. The master MA outputs a read request to the slave device SD to read a status data of the peripheral device 20 before processing the write data in the slave device SA. Because the read request output to the slave device SD from the master device MA is a synchronous event, the bridge 10 stops receiving new transaction requests from the master MD at this time, and flushes data stored in the buffering unit BF2 to guarantee data consistency. Namely, the master device MA first reads the status data of the slave device SD, and the bridge 10 must guarantee that the write data has been pushed into the slave device SA before the transaction request is accomplished. Before the slave device SD reads data or the peripheral device 20 returns the status data to the master device MA, the bridge 10 generates a flush request flush_req to the slave device SC and waits for the slave device SC to reply with a flush acknowledge signal to represent that the write data has been pushed into the slave device SA.

However, when receiving the flush request flush_req, the slave device SC does not push data or instructions into the buffering unit BF2 (i.e., the slave device SC stops data and instruction transfer thereof) and enables external master devices to retry transaction requests or asserts a waiting information to the external master devices. The slave device SC asserts the flush acknowledge signal flush_ack only when all transaction requests in the buffering unit BF2 are flushed. Since the transaction requests can not be processed when receiving the flush request flush_req, the system performance is degraded.

Figure 2:
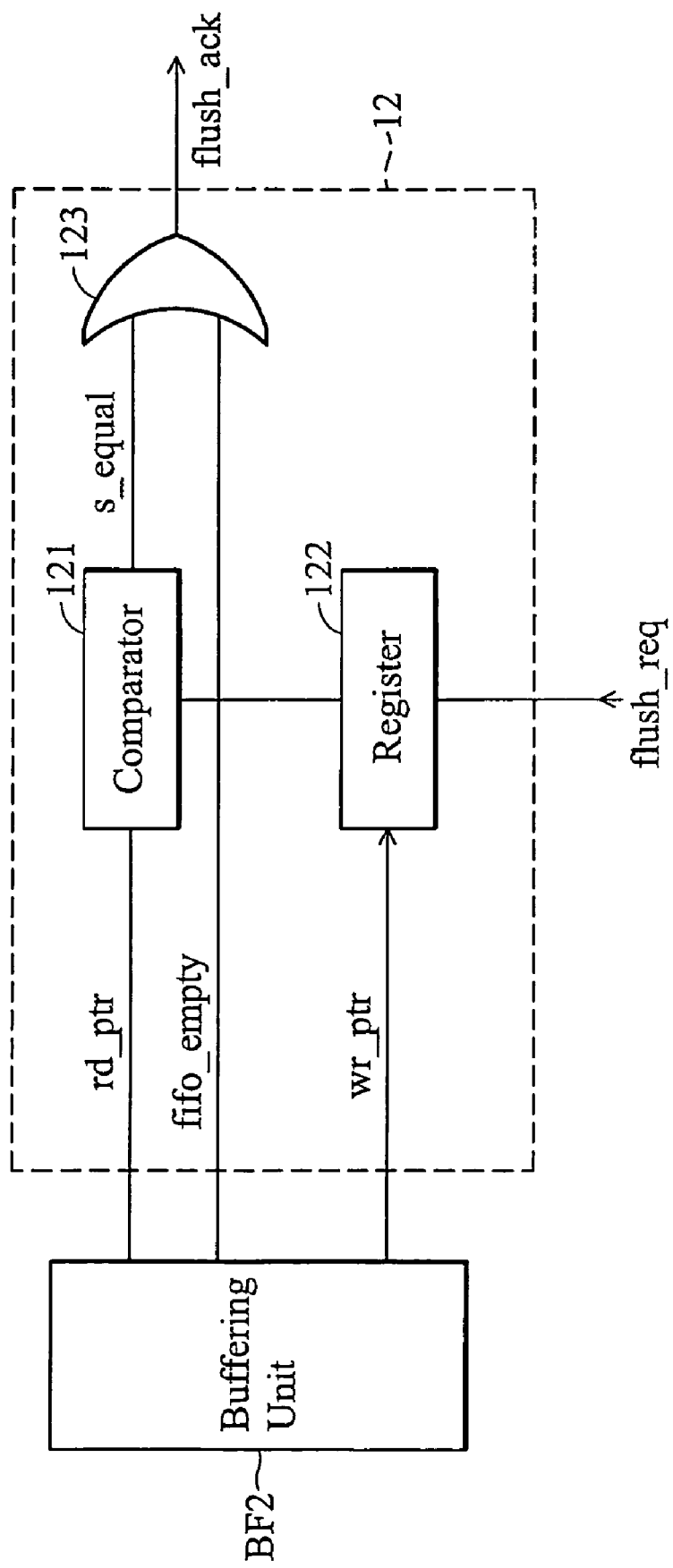
FIG. 2 shows an embodiment of a flush request control circuit according to the invention.

In order to improve system performance, the invention also provides other embodiments. FIG. 2 shows an embodiment of a flush request control circuit according to the invention. The flush request control circuit 12 can be disposed within the bridge 10 to receive a flush request flush_req, where after a suitable time interval, the flush request control circuit 12 outputs a flush acknowledge signal flush_ack to represent that all transaction requests in the buffering unit BF2 are flushed. For example, the flush request control circuit 12 can be integrated into the bridge 10, or disposed between the master device MC, slave device SC and buffering unit BF2, but is not limited thereto.

As shown in FIG. 2, the flush request control circuit 12 comprises a comparator 121, a register 122 and an output device 123. For example, the register 122 records a buffer write pointer wr_ptr when receiving the flush request flush_req from the master device MC. The comparator 121 compares a current buffer read pointer rd_ptr of the buffering unit BF2 with the recorded buffer write pointer wr_ptr. When the buffer read pointer rd_ptr and the recorded buffer write pointer wr_ptr are identical, it means that data or instructions stored in the buffering unit BF1 before receiving the flush request flush_req is/are read. Namely, the write operation is accomplished, and thus, the comparator 121 outputs a comparison signal s_equal.

In this embodiment, the recorded buffer write pointer wr_ptr and the current buffer read pointer rd_prt of the buffering unit BF2 received by the flush request control circuit 12 is provided by the buffering unit BF2. The buffer write pointer is used for designating a location that is written to, and the buffer read pointer is used for designating a location that is read from.

In this embodiment, the output unit 123 is an OR gate, but is not limited thereto. The output unit 123 outputs the flush acknowledge signal flush_ack when receiving the comparison signal s_equal, to indicate to the master device MC that all transaction requests in the buffering unit BF2 have been flushed. If there is no data or instruction in the buffering unit BF2 when receiving the flush request flush_req from the master device MC, the buffering unit BF2 outputs a buffer empty signal fifo_empty. In such case, the output unit 123 outputs the flush acknowledge signal flush_ack directly, thereby indicating to the master device MC that all transaction requests in the buffering unit BF2 have been flushed.

It means that data or instructions stored in the buffering unit BF2 before receiving the flush request flush_req is/are read when the current buffer read pointer rd_ptr of the buffering unit BF2 and the buffer write pointer wr_ptr recorded in the register 122 are identical. Next, the output unit 123 outputs the flush acknowledge signal flush_ack. Hence, the slave device SC does not stop receiving transaction requests from the master device MD in the peripheral device 20 and continues pushing data and/or instructions into the buffering unit BF2, such that system performance can be effectively improved.

Figure 3:
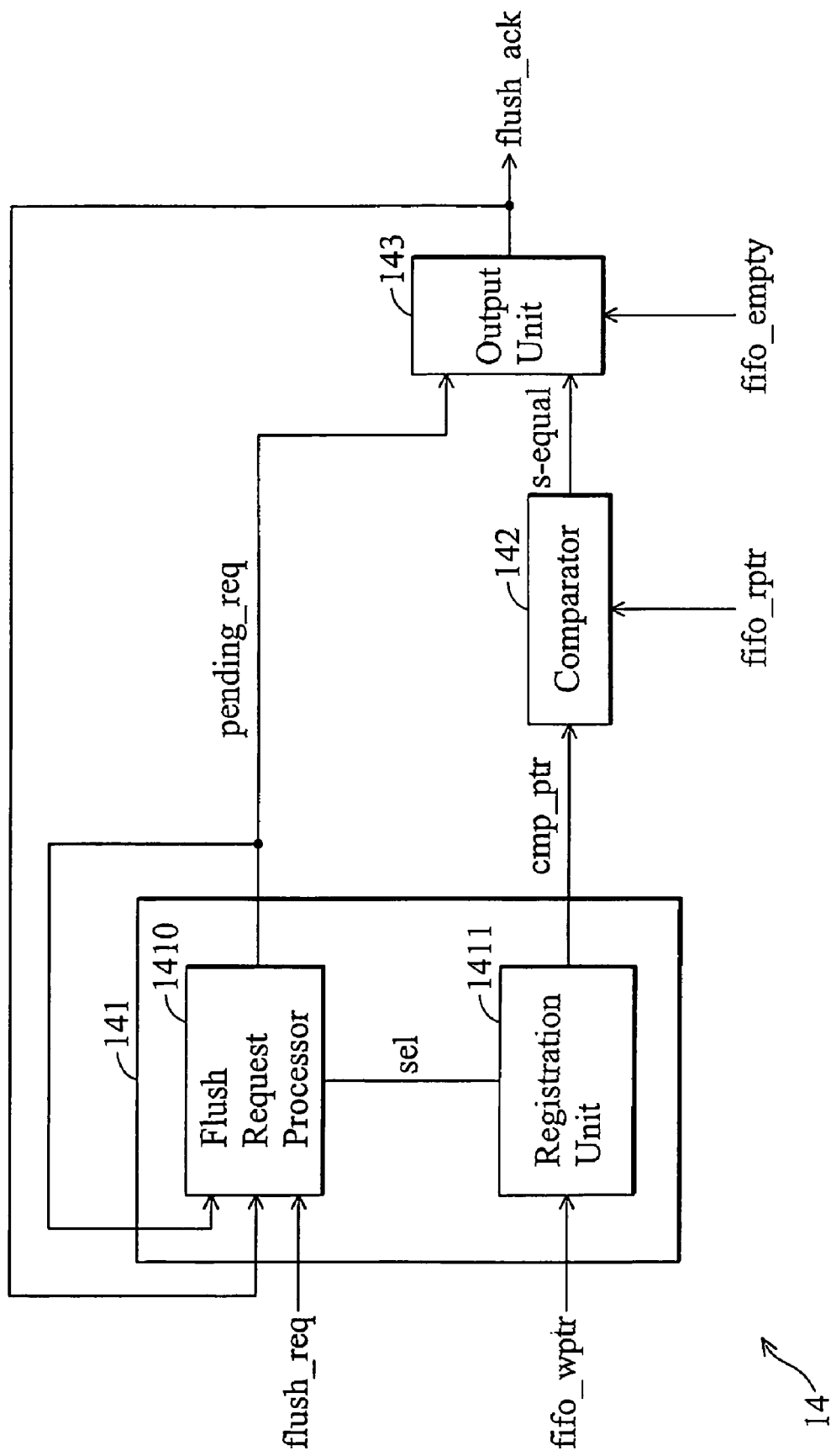
FIG. 3 shows another embodiment of the flush request control circuit.

FIG. 3 shows another embodiment of the flush request control circuit. As shown, the flush request control circuit 14 comprises a register 141, a comparator 142 and an output unit 143. The register 141 comprises a flush request processor 1410 and a registration unit 1411. Similarly, the flush request control circuit 14 can not only be integrated into the slave device SC as shown in FIG. 1, but also be disposed between the master device MC, the slave device SC and the buffer BF2. In this embodiment, the flush request processor 1410 outputs a selection signal sel and a control signal pending_req according to the flush request flush_req and the flush acknowledge signal flush_ack, when the flush request control circuit 14 receives the flush request flush_req asserted by the master device MC. When the flush request flush_req is asserted and the flush acknowledge signal flush_ack is deasserted, the control signal pending_req will be asserted. When the flush acknowledge signal flush_ack is asserted, the control signal pending_req is cleared. The registration unit 1411 outputs the comparison pointer cmp_req according to a buffer write pointer fifo_wptr of the buffering unit BF2 and the selection signal sel. In this embodiment, "assert" means the signal is at a logic high level and the "deassert" means the signal is at a logic low level, but is not limited thereto. The registration unit 1411 outputs the received buffer write pointer fifo_wptr to serve as the comparison pointer cmp_ptr when the selection signal sel is asserted. When the selection signal sel is deasserted, the comparison pointer cmp_ptr from the registration unit 1411 is maintained, i.e., the registration unit 1411 records the buffer write pointer fifo_wptr of the buffering unit BF2 when the flush request asserted. The comparator 142 compares a received buffer read pointer fifo_rptr with the buffer write pointer fifo_wptr recorded in the registration unit 1411 and outputs a comparison signal s_equal when they are identical, thereby indicating that all data stored before receiving the flush request flush_req in the buffering unit BF2 are written to the slave device SA. The output unit 143 outputs the flush acknowledge signal flush_ack according to the received comparison signal s_equal, the control signal pending_req and the buffer empty signal fifo_empty. When the comparison signal s_equal and the control signal pending_req are both asserted or only the buffer empty signal fifo_empty is asserted, the output unit 143 asserts the flush acknowledge signal flush_ack to represent that the buffering unit BF2 has been flushed. Because the output unit 143 outputs the flush acknowledge signal flush_ack in response to the comparison signal s_equal from the comparator 142 only when the control signal pending_req is asserted, the flush request control circuit 14 of the embodiments can prevent outputting an fake flush acknowledge signal flush_ack.

Figure 4:
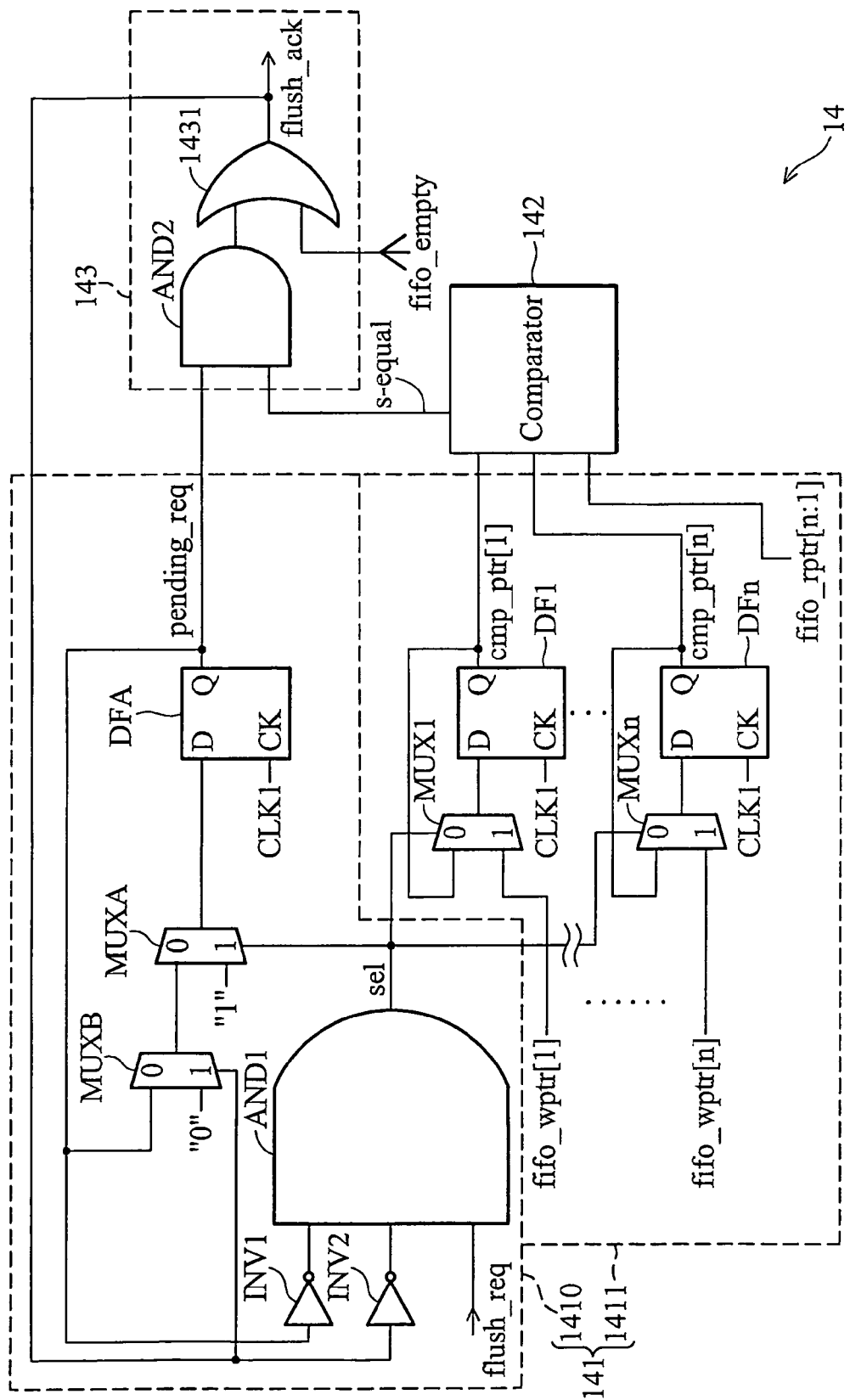
FIG. 4 shows a circuit diagram of the flush request control circuit shown in FIG. 3.

FIG. 4 shows a circuit diagram of the flush request control circuit shown in FIG. 3. As shown, the flush request processor 1410 comprises multiplexers DUXA and DUXB, an AND gate AND1, inverters INV1 and INV2 and a D-flip flop DFA. The input terminal of the inverter INV1 receives the control signal pending_req, and the inverter INV2 receives the flush acknowledge signal flush_ack. The AND gate AND1 outputs the selection signal sel according to the received flush request flush_req and outputs from the inverters INV1 and INV2. The multiplexer MUXA comprises two input terminals coupled to the output terminal of the multiplexer MUXB and data "1" (i.e., logic high), respectively, an output terminal coupled to the D-flip flop, and a control signal coupled to the selection signal sel from the AND gate AND1. The multiplexer MUXB comprises two input terminals coupled to the control signal pending_req and data "0" (i.e., logic low), respectively, an output terminal coupled to the multiplexer MUXA, and a control terminal coupled to the flush acknowledge signal flush_ack.

The registration unit 1411 of the register 141 comprises multiplexers MUX1~MUXn and D-flip flops DF1~DFn. The multiplexer MUX1 comprises two input terminals coupled to a buffer write pointer fifo_wptr[1] of the buffering unit BF2 and the output terminal of the D-flip flop DF1, respectively, a clock input terminal coupled to a clock signal CLK1, and an output terminal outputting a comparison pointer cmp_ptr[1] to the comparator 142 and an input terminal of the multiplexer MUX1. Because one D-flip flop cooperating with a multiplexer can only lock one bit data and the buffer write pointer fifo_wptr[n:1] usually has n bits (n>=1), the registration unit 1411 comprises n D-flip flops DF1~DFn and n multiplexers MUX1~MUXn to completely record the buffer write pointer fifo_wptr[n:1].

The comparator 142 comprises a plurality of input terminals coupled to the output terminals of the D-flip flops DF1~DFA and the buffer write pointer fifo_wptr[n:1], respectively, and an output terminal outputting the comparison signal sel to the output unit 143. The output unit 143 comprises an AND gate AND2 and an OR gate 1431. The multiplexer MUXA comprises two input terminals coupled to an output terminal of the multiplexer MUXB and data "1" (i.e., logic high) and an output terminal coupled to the D-flip flop DFA. The multiplexer MUXB comprises two input terminals coupled to an output terminal of the D-flip flop DFA and data "0" (i.e., logic low) and an output terminal coupled to the input terminal of the multiplexer MUXA. The AND gate AND1 comprises two input terminals coupled to the comparison signal s_equal from the comparator 142 and the control signal pending_req from the register 141, respectively, and an output terminal coupled to the OR gate 1431. The OR gate 1431 comprises two input terminals the output terminal of the AND gate AND1 and the buffer empty signal fifo_empty, respectively.

Figure 5:
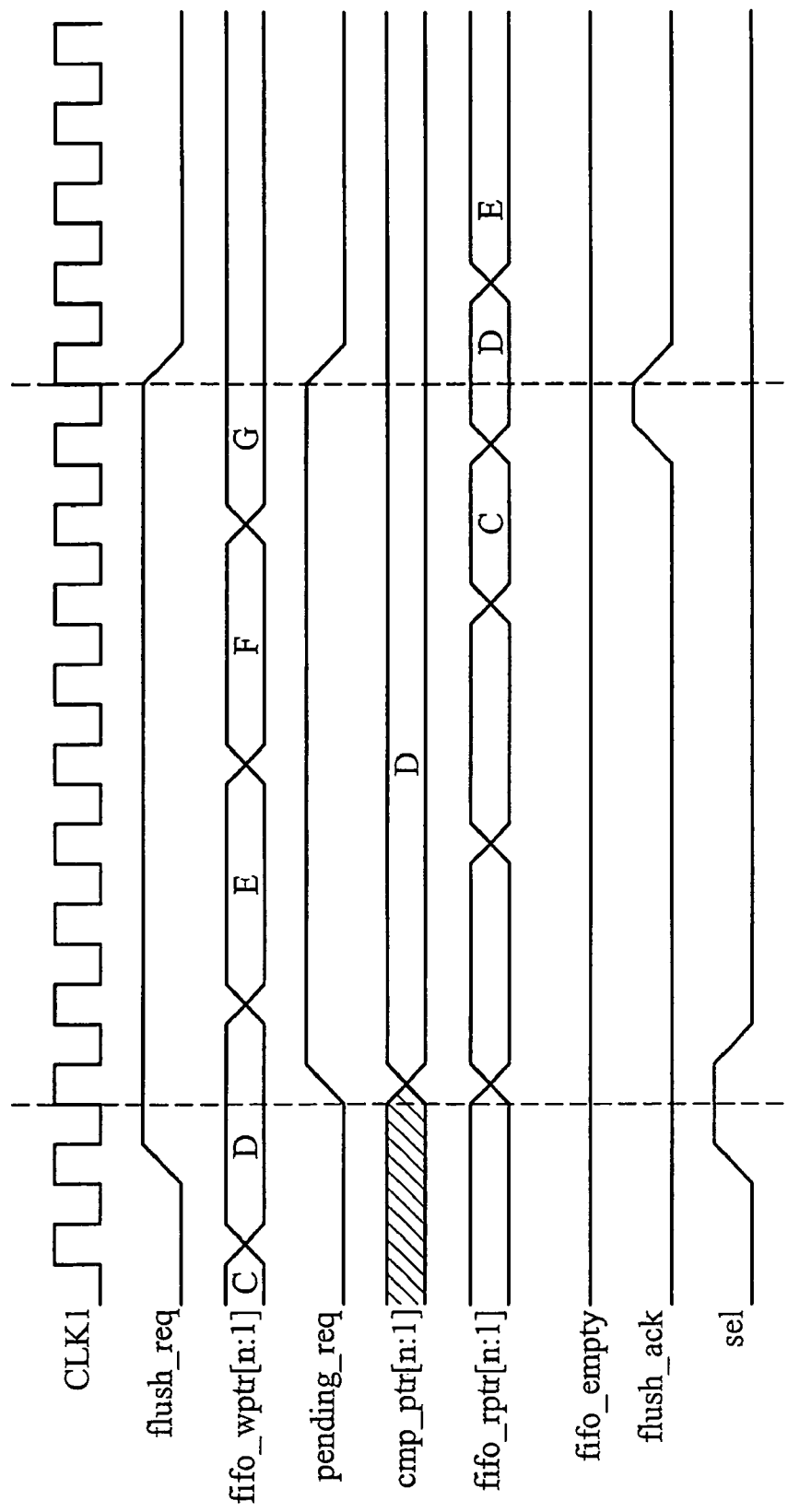
FIG. 5 is a timing chart of the flush request control circuit shown in FIG. 4.

Operations of the flush request control circuit 14 are illustrated with reference to FIG. 5.

When the register 141 receives the flush request flush_req from the master device MC, the flush request processor 1410 outputs the control signal pending_req with a logic high. For example, because the flush acknowledge signal flush_ack and the control signal pending_req are not initially asserted (logic low), the selection signal sel from the AND gate AND1 becomes a logic high from a logic low when the control signal pending_req is a logic high, such that a logic high signal (i.e., the data "1") is output to the D-flip flop DFA via the multiplexer MUXA. Hence, the output of the D-flip flop DFA becomes a logic high from a logic low, i.e. the D-flip flop DFA outputs control signal pending_req with a logic high.

Meanwhile, the multiplexers MUX1~MUXn of the registration unit 1411 output the current buffer write pointer fifo_wptr[n:1] of the buffering unit BF2 (i.e., D shown in FIG. 5) to the D-flip flops DF1~DFn according to the selection signal sel from the flush request processor 1410, such that the D-flip flops DF1~DFn output the received buffer write pointer fifo_wptr[n:1] to the comparator 142 to serve as the comparison pointer cmp_prt[n:1].

Because the control signal pending_req from the D-flip flop DFA becomes a logic high, the output terminal of the inverter INV1 becomes a logic high from a logic low, such that the selection signal sel outputted by the AND gate AND1 becomes a logic high from a logic low. Further, input terminals of the D-flip flops DF1~DFn are coupled to output terminals thereof via the multiplexers MUX1~MUXn, such that the current buffer write pointer fifo_wptr[n:1] of the buffering unit BF2 (i.e., the comparison pointer cmp_ptr[n:1]) can be recorded. For example, the D-flip flops DF1~DFn and the multiplexers MUX1~MUXn form a register to record the current buffer write pointer fifo_wptr[n:1] of the buffering unit BF2 to serve as the comparison pointer cmp_ptr[n:1].

When a current buffer read pointer fifo_wptr[n:1] of the buffering unit BF2 and the recorded buffer write pointer fifo_wptr[n:1] are identical, it means that the data or instructions pushed before receiving the flush request flush_req has been read. Hence, the output terminal of the comparator 142 becomes a logic high from a logic low. Because the control signal pending_req and the output terminal of the comparator 142 are both at a logic high, the output terminal of the AND gate AND2 becomes a logic high from a logic low, such that the output terminal of the OR gate 1431 becomes a logic high from a logic low, i.e., the flush acknowledge signal flush_ack is outputted.

If there is no data or instruction in the buffering unit BF2 when receiving the flush request flush_req from the master device MC, the buffering unit BF2 asserts the buffer empty signal fifo_empty such that the output unit 143 asserts the flush acknowledge signal flush_ack to indicate to the master device MC that all transaction requests in the buffering unit BF2 have been flushed.

Because the flush request control circuit 14 outputs the flush acknowledge signal flush_ack to indicate to the master device MC when the data or instructions pushed before receiving the flush request flush_req has been read, the slave device SC does not stop receiving new transaction requests from the peripheral device 20 even when the flush request flush req is received, and continues pushing data or instructions into the buffering unit BF2, thus, improving system performance.

Figure 6:
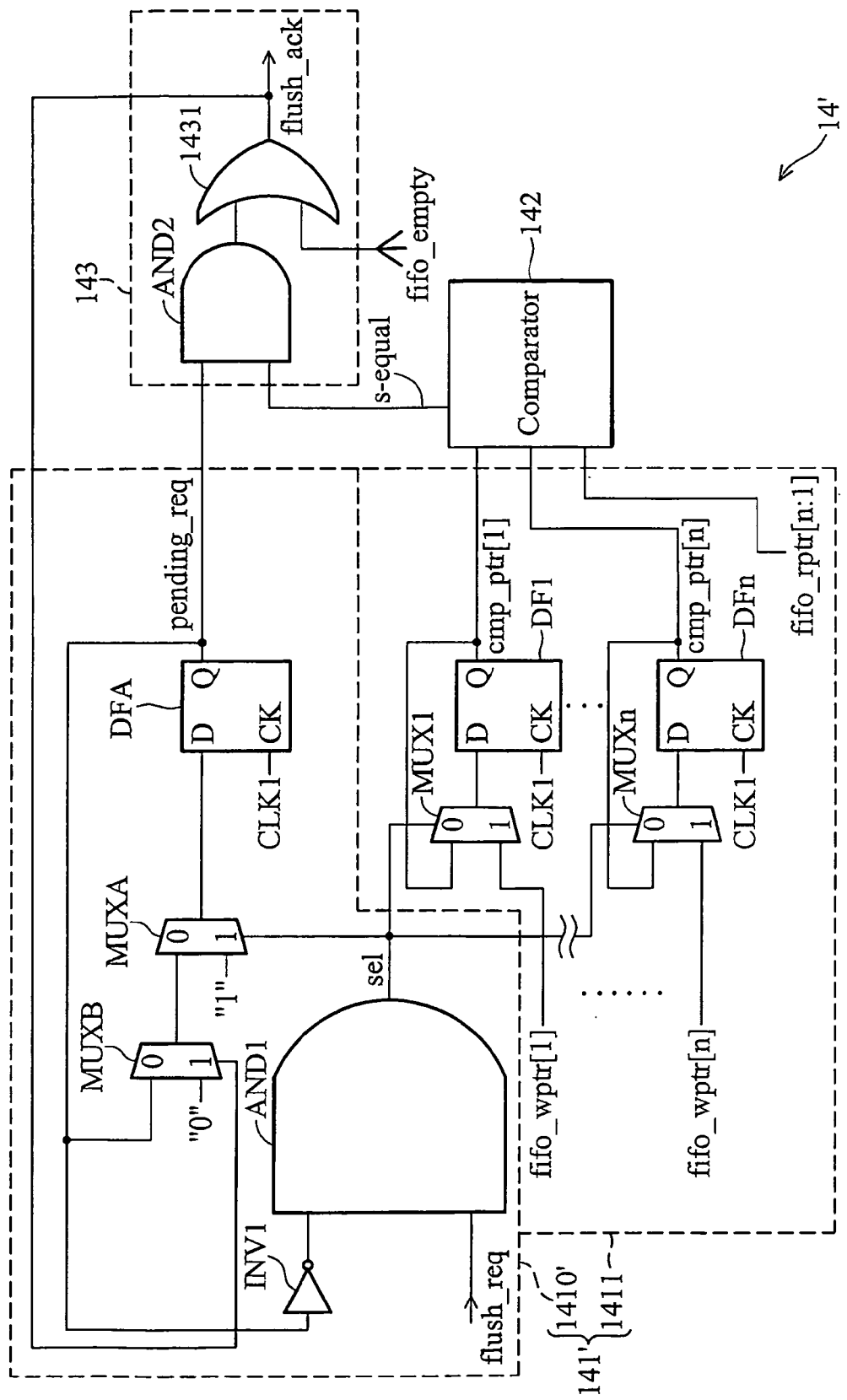
FIG. 6 is another circuit diagram of the flush request control circuit shown in FIG. 3.

FIG. 6 is another circuit diagram of the flush request control circuit shown in FIG. 3. As shown, the flush request control circuit 14' is similar to the flush request control circuit 14 shown in FIG. 4, and the flush request control circuit 14' comprises a register 141", a comparator 142 and an output unit 143, in which the register 141' comprises a flush request processor 1410' and a registration unit 1411. When the flush request control circuit 14' receives the flush request flush_req from the master device SC, the flush request processor 1410' outputs the control signal pending_req and the selection signal sel according to the flush request flush_req and the flush acknowledge signal flush_ack. The registration unit 1411 records the current buffer write pointer fifo_wptr[n:1] according to the selection signal sel to serve the comparison pointer cmp_ptr[n:1] and output to the comparator 142. The comparator 142 compares the received buffer read pointer fifo_rptr[n:1] with the recorded buffer write pointer fifo_ptr[n:1] in the registration unit 1411 to determine whether the data or instructions pushed before receiving the flush request flush_req has been read. The output unit 143 outputs the flush acknowledge signal flush_ack according to the comparison signal s_equal, the control signal pending_req and the buffer empty signal fifo_empty.

The flush request processor 1410' comprises multiplexers MUX1 and MUX2, an AND gate AND1, an inverter INV1 and a D-flip flop DFA. The AND gate AND1 generates and outputs the selection signal sel according to the received flush request flush_req and an inversion signal of the control signal pending_req from the inverter INV1. The multiplexer MUXB selectively outputs the control signal pending_req and logic low according to the flush acknowledge signal flush_ack. The multiplexer MUXA selectively outputs a logic high and the output of the multiplexer MUXB. Thus, when the flush request flush_req is asserted and the control signal pending_req is deasserted, the selection signal sel from the AND gate AND1 is asserted, such that the registration unit 1411 receives and outputs the buffer write pointer fifo_wptr[n:1] of the buffering unit BF2. Namely, the control signal pending_req is asserted in response to the asserted selection signal sel. When the flush request flush_req and the control signal pending_req are both asserted, the selection signal sel from AND gate AND1 becomes logic low, such that the registration unit 1411 records the received buffer write pointer fifo_wptr[n:1]. The output unit 143 directly outputs the flush acknowledge signal flush_ack according to the buffer empty signal fifo_empty when the buffering unit BF2 is empty. However, because the status of the selection signal sel is not affected by the flush acknowledge signal flush_ack, the registration unit 1411 is prone to execute unnecessary operations due to the selection signal sel from the flush request processor 1410'. In order to prevent such a scenario, when the flush acknowledge signal flush_ack is asserted, the flush request flush_req can be deasserted by the master device MC.

Figure 7:
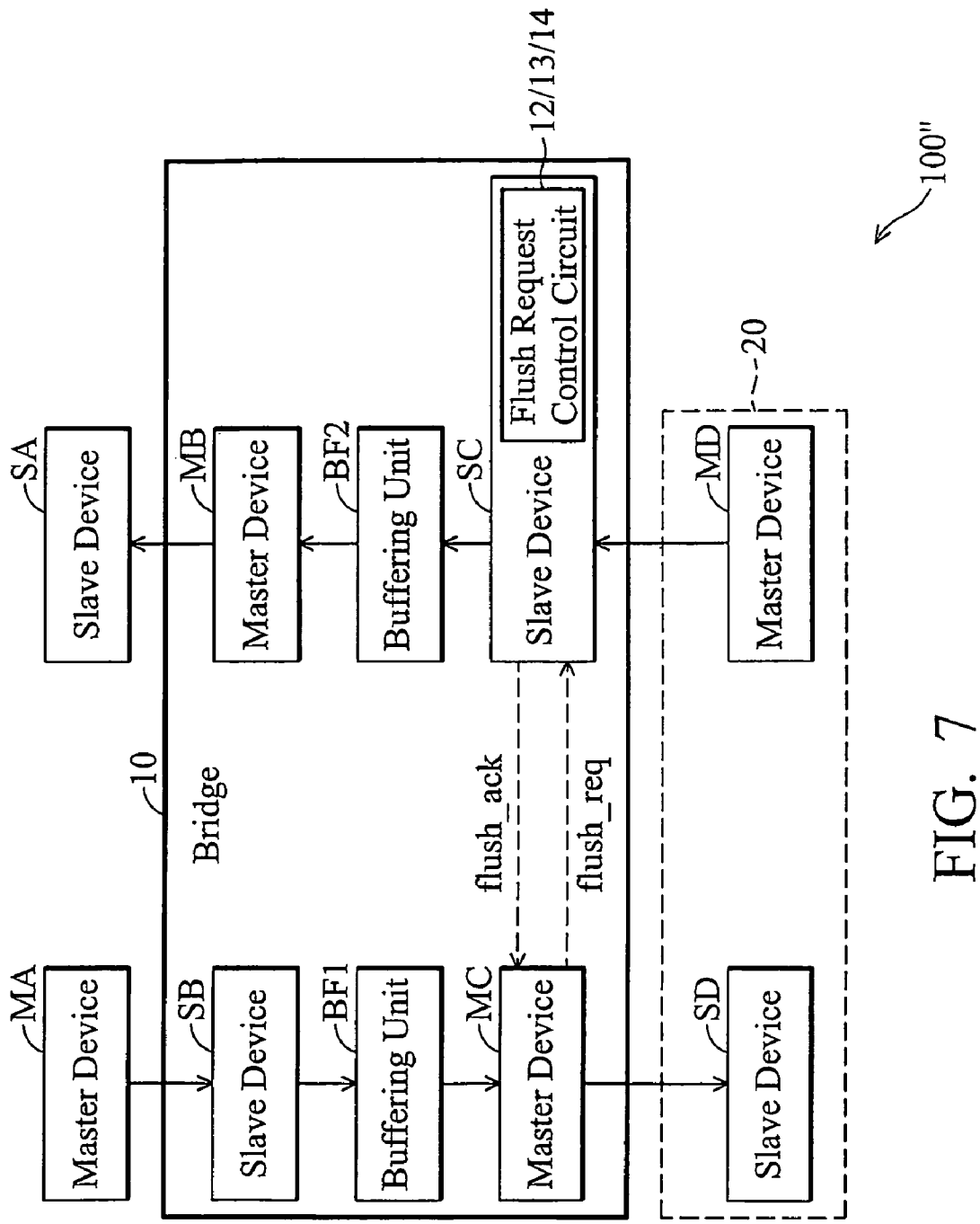
FIG. 7 shows another embodiment of the electronic system.

FIG. 7 shows another embodiment of the electronic system. As shown, the electronic system 100" is similar to the electronic system 100 in FIG. 1, wherein the only difference is that one of the flush request control circuit 12 shown in FIG. 2, the flush request control circuit 14 shown in FIG. 4 and the flush request control circuit 14' shown in FIG. 6 can be added to the slave device SC in the bridge 10.

When completing a write transaction request, the peripheral device 20 outputs an interrupt signal to the master device MA (such as CPU) to indicate to the slave device SA (such as system memory) to read (i.e., load) new data. Before processing the loaded data in the slave device SA, the master device MA checks the status of the peripheral device 20. Namely, the master device MA reads the status information of the slave device SD, and before such transaction is accomplished, the bridge 10 must confirm that the loaded data has been pushed in to the slave device SA. The bridge 10 provides a flush request to the slave device SC and waits for the slave device SC to reply with a flush acknowledge signal flush_ack representing that the loaded data has been pushed into the slave device SA, before the slave device SD reads new data or returns loading data to the master device MA.

The flush request control circuit 12 or 14 in the bridge 10 buffers (or records) the current buffer write pointer wr_ptr (or fifo_wptr[n:1]) of the buffering unit BF2 when the master device MC asserts the flush request flush_req. When a current buffer read pointer rd_prt (or fifo_rptr[n:1]) and the recorded buffer write pointer wr_ptr (or fifo_wptr[n:1]) of the buffering unit BF2 are identical, the flush request control circuit 12 or 14 outputs the flush acknowledge signal flush_ack to indicate to the master device MC that data or instructions pushed before receiving the flush request flush_req has/have been read. Hence, even if the flush request flush_req is asserted by the master device MC, the slave device SC would not stop receiving transaction requests from the master device MD in the peripheral device 20 and continue pushing data and/or instructions into the buffering unit BF2, and thus system performance is improved. In some embodiments, the flush request control circuit 12, 14 or 14' can also be disposed in the slave device SB or SD, but is not limited thereto.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. A bridge, comprising:
    a buffering unit for buffering data or instructions, wherein the buffering unit comprises a buffer write pointer for designating a location that is written to and a buffer read pointer for designating a location that is read from;
    a first master device for outputting a flush request to empty the buffering unit; and
    a flush request control circuit for recording the buffer write pointer of the buffer in response to the flush request and outputting a flush acknowledgement signal to the first master device in response of that the buffer read pointer of the buffering unit is identical to the recorded buffer write pointer, to inform the first master device that the buffering unit is empty.

2. The bridge as claimed in claim 1, further comprising a slave device for pushing the data or the instructions into the buffering unit, wherein the slave device receives transaction requests of a second master device from the peripheral device and pushes corresponding data or instructions into the buffering unit after receiving the flush request.

3. The bridge as claimed in claim 1, wherein the flush request control circuit comprises:
    a register for recording the buffer write pointer according to the flush request and outputting the buffer write pointer to serve as a comparison pointer;

a comparator for comparing the comparison pointer with the buffer read pointer of the buffering unit to determine whether the buffering unit is empty; and an output unit for outputting the flush acknowledgement signal according to the compared result.

4. The bridge as claimed in claim 3, wherein the register in the flush request control circuit generates a control signal in response to the flush request, and the output unit outputs the flush acknowledgement signal to the first master device according to the control signal and the compared result.

5. The bridge as claimed in claim 3, wherein the output unit further receives a buffer empty signal and outputs the flush acknowledgement signal in response of that the buffer empty signal is asserted.

6. The bridge as claimed in claim 4, wherein the register in the flush request control circuit further receives the flush acknowledgement signal and outputs the control signal to the output unit according to the flush acknowledgement signal and the flush request.

7. The bridge as claimed in claim 4, wherein the flush request control circuit clears the control signal after outputting the flush acknowledgement signal.

8. The bridge as claimed in claim 4, wherein the buffer of the flush request control circuit comprises:

a flush request processor for outputting a selection signal according to the flush request and the control signal; and a registration unit for recording the buffer write pointer of the buffering unit according to the selection signal, wherein the flush request processor asserts the selection signal when the control signal received by the flush request processor is deasserted and the flush request is asserted, thereby enabling the registration unit to receive the buffer write pointer.

9. The bridge as claimed in claim 8, wherein the flush request processor deasserts the selection signal in response of that the control signal received by the flush request processor is asserted, thereby enabling the registration unit to record the buffer write pointer.

10. A flush request control circuit for generating a flush acknowledgement signal to represent that a buffering unit is empty according to a flush request, the buffering unit comprising a buffer write pointer for designating a location that is written to and a buffer read pointer for designating a location that is read from, the flush request control circuit comprising:

a register for recording the buffer write pointer according to the flush request and outputting the buffer write pointer to serve as a comparison pointer;

a comparator for comparing the comparison pointer with the buffer read pointer of the buffering unit to determine whether the buffering unit is empty; and an output unit for outputting the flush acknowledgement signal according to the compared result, wherein the output unit outputs the flush acknowledgement signal to represent that the buffering unit is empty in response of that the comparison pointer and the received buffer read pointer are identical.

11. The flush request control circuit as claimed in claim 10, wherein the register generates a control signal according to the flush request, and in response of that the control signal is asserted and the comparison pointer and the buffer read pointer received by the comparison unit are identical, the output unit outputs the flush acknowledgement signal.

12. The flush request control circuit as claimed in claim 10, wherein the output unit further receives a buffer empty signal, and outputs the flush acknowledgement signal according to the asserted buffer empty signal.

13. The flush request control circuit as claimed in claim 11, wherein the register further receives the flush acknowledgement signal and outputs the control signal to the output unit according to the flush acknowledgement signal and the flush request.

14. The flush request control circuit as claimed in claim 11, wherein the register clears the control signal in response to the asserted flush acknowledgement signal.

15. The flush request control circuit as claimed in claim 11, wherein the buffer comprises:

a flush request processor for outputting a selection signal according to the flush request and the control signal; and a registration unit for recording the buffer write pointer of the buffering unit according to the selection signal, wherein the flush request processor asserts the selection signal in response of that the control signal received by the flush request processor is deasserted and the flush request is asserted, thereby enabling the registration unit to receive the buffer write pointer.

16. The flush request control circuit as claimed in claim 15, wherein the flush request processor deasserted the selection signal in response to the asserted control signal, thereby enabling the registration unit to record the buffer write pointer.

17. A data flush method for an electronic system comprising a buffering unit with a buffer write pointer for designating a location that is written to and a buffer read pointer for designating a location that is read from, comprises:

recording the buffer write pointer of the buffering unit in response of a flush request to empty the buffering unit from a first master device;

comparing the buffer read pointer of the buffering unit with the recorded buffer write pointer; and outputting a flush acknowledgement signal to the first master device in response of that the buffer read pointer and the recorded buffer write pointer are identical.

18. The method as claimed in claim 17, further receiving transaction requests and pushing corresponding data or instructions into the buffering unit, after receiving the flush request.

19. The method as claimed in claim 17, further comprising:

generating a control signal according to the flush request;

generating a comparison signal in response of that the recorded buffer write pointer and the buffer read pointer are identical; and outputting the flush acknowledgement signal according to the control signal and the comparison signal.

20. The method as claimed in claim 19, further comprising clearing the control signal after outputting the flush acknowledgement signal.

21. The method as claimed in claim 19, further comprising:

outputting a selection signal according to the flush request and the control signal; and recording the buffer write pointer of the buffering unit according to the selection signal.

22. The method as claimed in claim 17, further comprising:

enabling a buffer empty signal in response of that the flush request is received and the buffering unit is empty; and outputting the flush acknowledgement signal to the first master device to represent that the buffering unit is empty according to the buffer empty signal.

* * * * *